US006228959B1

(12) United States Patent
Nagy

(10) Patent No.: US 6,228,959 B1
(45) Date of Patent: May 8, 2001

(54) SINGLE-SITE CATALYSTS CONTAINING HOMOAROMATIC LIGANDS

(75) Inventor: Sandor Nagy, Mason, OH (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/418,938

(22) Filed: Oct. 15, 1999

(51) Int. Cl.⁷ .............................. C08F 4/64; C08F 4/642; C08F 4/649

(52) U.S. Cl. ..................... 526/134; 526/160; 526/161; 526/172; 526/943; 502/104; 502/117; 502/152; 502/154; 502/155; 556/52; 556/53

(58) Field of Search ..................................... 526/134, 160, 526/161, 172, 943; 502/104, 117, 152, 154, 155

(56) References Cited

U.S. PATENT DOCUMENTS

| 4,752,597 | 6/1988 | Turner ................... 502/104 |
| 4,791,180 | 12/1988 | Turner ................... 526/160 |
| 5,153,157 | 10/1992 | Hlatky et al. ........... 502/117 |
| 5,198,401 | 3/1993 | Turner et al. ........... 502/155 |
| 5,241,025 | 8/1993 | Hlatky et al. ........... 526/129 |
| 5,539,124 | 7/1996 | Etherton et al. ......... 548/402 |
| 5,554,775 | 9/1996 | Krishnamurti et al. .... 556/7 |
| 5,637,659 | 6/1997 | Krishnamurti et al. .... 526/133 |
| 5,637,660 | 6/1997 | Nagy et al. ............. 526/160 |
| 5,902,866 | 5/1999 | Nagy et al. ............. 526/133 |

OTHER PUBLICATIONS

W. Moore et al., *J. Org. Chem.* 28 (1963) 2200–2205.
S. Winstein et al., *J. Am. Chem. Soc.* 89 (1967) 3656–3657.
R. Carey et al., *Advanced Organic Chemistry*, 3$^{rd}$ ed., Part A, (1990) 518–520.
R. Childs, *Acc. Chem. Res.* 17 (1984) 347–352.
J. Brown et al., *Chem Commun.* (1965) 376–377.
L. Paquette, *Angew. Chem. Int. Ed. Engl.* 17 (1978) 106–117.

*Primary Examiner*—David W. Wu
*Assistant Examiner*—R. Rabago
(74) *Attorney, Agent, or Firm*—Jonathan L. Schuchardt

(57) ABSTRACT

A single-site olefin polymerization catalyst and method of making it are disclosed. The catalyst comprises an activator and an organometallic complex. The complex comprises a Group 3 to 10 transition or lanthanide metal, M, and at least one homoaromatic anionic ligand that is π-bonded to M. Molecular modeling results indicate that single-site catalysts based on homoaromatic anionic ligands (e.g., bicyclo[3.2.1] octa-2,6-dienyl) will rival the performance of catalysts based on cyclopentadienyl and substituted cyclopentadienyl ligands.

12 Claims, No Drawings

SINGLE-SITE CATALYSTS CONTAINING HOMOAROMATIC LIGANDS

FIELD OF THE INVENTION

The invention relates to catalysts useful for olefin polymerization. In particular, the invention relates to "single-site" catalysts that incorporate at least one homoaromatic ligand.

BACKGROUND OF THE INVENTION

Interest in single-site (metallocene and non-metallocene) catalysts continues to grow rapidly in the polyolefin industry. These catalysts are more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes commonly include one or more cyclopentadienyl groups, but many other ligands have been used. Putting substituents on the cyclopentadienyl ring, for example, changes the geometry and electronic character of the active site. Thus, a catalyst structure can be fine-tuned to give polymers with desirable properties. Other known single-site catalysts replace cyclopentadienyl groups with one or more heteroatomic ring ligands such as boraaryl (see, e.g., U.S. Pat. No. 5,554,775), pyrrolyl, indolyl, (U.S. Pat. No. 5,539,124), or azaborolinyl groups (U.S. Pat. No. 5,902,866).

Single-site catalysts typically feature at least one polymerization-stable, anionic ligand that is purely aromatic, as in a cyclopentadienyl system. All five carbons in the planar cyclopentadienyl ring participate in bonding to the metal in η-5 fashion. The cyclopentadienyl anion functions as a 6π-electron donor. Similar bonding apparently occurs with heteroatomic ligands such as boratabenzenyl or azaborolinyl.

In contrast, olefin polymerization catalysts that contain "homoaromatic" anions are not known. "Homoaromatic" refers to systems in which a stabilized, conjugated ring system is formed by bypassing a saturated atom. (See F. Carey and R. Sundberg, *Advanced Organic Chemistry*, 3$^{rd}$ Ed., Part A, 518–520 (1990).) The observation of $^1$H NMR aromatic ring currents helped to identify the homotropilium cation (see R. Childs, *Acc. Chem. Res.* (1984) 17, 347). Unexpectedly rapid deprotonation of bicyclo[3.2.1]octa-2,6-diene demonstrated generation of a bishomoaromatic cyclopentadienide anion (see J. Brown and J. Occolowitz, *Chem. Commun.* (1965) 376):

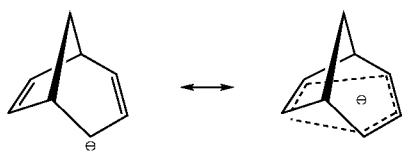

This is a "bishomoaromatic" system because two saturated carbons (at the bridgeheads) are bypassed to give the conjugated, stabilized anion. S. Winstein and coworkers confirmed the presence of the bishomoaromatic anion by $^1$H NMR (see *J. Am. Chem. Soc.* 89 (1967) 3656). L. Paquette summarizes a wealth of information about homoaromaticity in a thorough review article (*Angew. Chem. Int. Ed. Engl.* 17 (1978) 106).

In spite of the availability of synthetic routes to homoaromatic anions, their use as ligands for metallocene or single-site catalysts for olefin polymerization has not been suggested. On the other hand, the ease with which a host of interesting homoaromatic ligands can be prepared suggests that catalysts with advantages such as higher activity and better control over polyolefin properties are within reach. Ideally, these catalysts would avoid the all-too-common, multi-step syntheses from expensive, hard-to-handle starting materials and reagents.

SUMMARY OF THE INVENTION

The invention is a single-site olefin polymerization catalyst. The catalyst comprises an activator and an organometallic complex. The organometallic complex comprises a Group 3 to 10 transition or lanthanide metal, M, and at least one homoaromatic anion that is π-bonded to M.

Evidence from molecular modeling studies suggests that single-site catalysts based on homoaromatic anionic ligands (e.g., bicyclo[3.2.1]octa-2,6-dienyl) will rival the performance of catalysts based on cyclopentadienyl and substituted cyclopentadienyl ligands.

The invention includes a simple synthetic route to the single-site olefin polymerization catalysts. The ease and inherent flexibility of the synthesis puts polyolefin makers in charge of a new family of single-site catalysts.

DETAILED DESCRIPTION OF THE INVENTION

Catalysts of the invention comprise an activator and an organometallic complex. The catalysts are "single site" in nature, i.e., they are distinct chemical species rather than mixtures of different species. They typically give polyolefins with characteristically narrow molecular weight distributions (Mw/Mn<3) and good, uniform comonomer incorporation.

The organometallic complex includes a Group 3 to 10 transition or lanthanide metal, M. More preferred complexes include a Group 4 to 6 transition metal; most preferably, the complex contains a Group 4 metal such as titanium or zirconium.

The organometallic complex also comprises at least one homoaromatic anion that is π-bonded to the metal. By "homoaromatic," we mean a stabilized, conjugated ring system formed by bypassing a saturated atom. In other words, at least one atom in the ring is not part of the π-electron system that bonds to M in the organometallic complex. Preferably, the homoaromatic anion is a monoanionic, 6π-electron system. The homoaromatic anion can be mono, bis, or trishomoaromatic (i.e., it can contain one, two, or three saturated atoms that do not participate in the aromaticity). Bishomoaromatic anions are preferred. The homoaromatic anions are usually generated from the corresponding neutral compounds by deprotonation with a potent base as is described in more detail below.

Preferred homoaromatic anions are bicyclic [3.2.1] and [3.2.2] ring systems that may be hydrocarbons or may include heteroatoms. The homoaromatic anion may be bridged to another ligand, which may or may not be another homoaromatic anion. Exemplary homoaromatic anions are illustrated below:

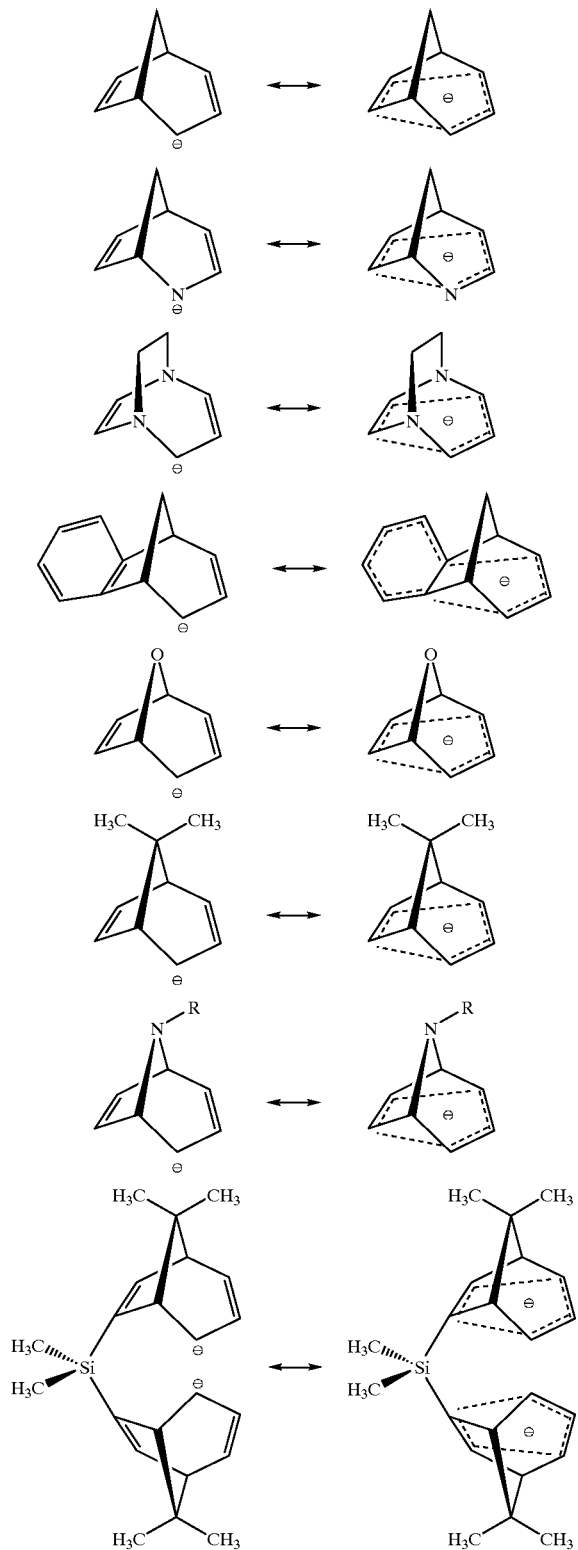

The organometallic complex optionally includes one or more additional polymerization-stable, anionic ligands. Examples include substituted and unsubstituted cyclopentadienyl, fluorenyl, and indenyl, or the like, such as those described in U.S. Pat. Nos. 4,791,180 and 4,752,597, the teachings of which are incorporated herein by reference.

A preferred group of polymerization-stable ligands are heteroatomic ligands such as boraaryl, pyrrolyl, indolyl, quinolinyl, pyridinyl, and azaborolinyl as described in U.S. Pat. Nos. 5,554,775, 5,539,124, 5,637,660, and 5,902,866, the teachings of which are incorporated herein by reference. The organometallic complex also usually includes one or more labile ligands such as halides, alkyls, alkaryls, aryls, dialkylaminos, or the like. Particularly preferred are halides, alkyls, and alkaryls (e.g., chloride, methyl, benzyl).

The homoaromatic anions and/or polymerization-stable ligands can be bridged. For instance, a —$CH_2$—, —$CH_2CH_2$—, or $(CH_3)_2Si$ bridge can be used to link two homoaromatic anions or a homoaromatic anion and a polymerization-stable ligand. Groups that can be used to bridge the ligands include, for example, methylene, ethylene, 1,2-phenylene, and dialkyl silyls. Normally, only a single bridge is included. Bridging changes the geometry around the transition or lanthanide metal and can improve catalyst activity and other properties such as comonomer incorporation.

Exemplary organometallic complexes:
(bicyclo[3.2.1]octa-2,6-dienyl)zirconium trichloride,
(bicyclo[3.2.1]octa-2,6-dienyl)titanium trimethyl,
(cyclopentadienyl)(bicyclo[3.2.1]octa-2,6-dienyl) zirconium dichloride,
bis(bicyclo[3.2.1]octa-2,6-dienyl)zirconium dichloride,
(4-azabicyclo[3.2.1]octa-2,6-dienyl)zirconium trichloride,
(1,5-diazabicyclo[3.2.2]nona-2,6-dienyl)titanium tribenzyl,
(benzo[f]bicyclo[3.2.1]octa-2,6-dienyl)hafnium trichloride,
(8-oxabicyclo[3.2.1]octa-2,6-dienyl)(cyclopentadienyl) hafnium dichloride,
(8,8-dimethylbicyclo[3.2.1]octa-2,6-dienyl)zirconium trichoride,
(8-methyl-8-azabicyclo[3.2.1]octa-2,6-dienyl)zirconium trimethoxide,
ethylene-5,5'-bis(bicyclo[3.2.]octa-2,6-dienyl)zirconium dimethyl,
and the like.

The catalysts include an activator. Suitable activators ionize the organometallic complex to produce an active olefin polymerization catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis (pentafluorophenyl)borate, lithium tetrakis (pentafluorophenyl)aluminate, anilinium tetrakis (pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference.

The amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 0.1 to about 500 moles, of aluminum per mole of M. When the activator is an organoborane or an ionic borate or aluminate, the amount used will be within the range of about 0.01 to about 5000 moles, preferably from about 0.1 to about 500 moles, of activator per mole of M.

If desired, a catalyst support such as silica or alumina can be used. However, the use of a support is generally not necessary for practicing the process of the invention.

The invention includes a method for making the organometallic complex. The method comprises deprotonating a homoaromatic anion precursor with at least one equivalent of a potent base such as lithium diisopropylamide, n-butyllithium, sodium hydride, a Grignard reagent, or the like. The resulting anion is reacted with a Group 3 to 10 transition or lanthanide metal source to produce an organometallic complex. The complex comprises the metal, M, and at least homoaromatic anionic ligand that is n-bonded to the metal. Any convenient source of the Group 3 to 10 transition or lanthanide metal can be used. Usually, the source is a complex that contains one or more labile ligands that are easily displaced by the homoaromatic anion. Examples are halides (e.g., $TiCl_4$, $ZrCl_4$), alkoxides, amides, and the like. The metal source can incorporate one or more of the polymerization-stable anionic ligands described earlier. The organometallic complex can be used "as is." Often, however, the complex is converted to an alkyl derivative by treating it with an alkylating agent such as methyl lithium. The alkylated complexes are more suitable for use with certain activators (e.g., ionic borates).

The homoaromatic anion is preferably generated at low temperature (0° C. to −100° C.), preferably in an inert solvent (e.g., a hydrocarbon). The anion is then usually added to a solution of the transition or lanthanide metal source at low to room temperature. After the reaction is complete, by-products and solvents are removed to give the desired transition metal complex.

The catalysts are particularly valuable for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes. Suitable methods for polymerizing olefins using the catalysts of the invention are described, for example, in U.S. Pat. Nos. 5,902,866, 5,637,659, and 5,539,124, the teachings of which are incorporated herein by reference.

The olefin polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Preparation of Bis(bicyclo[3.2.1]octa-2,6-dienyl) zirconium Dichloride

Bicyclo[3.2.1]octa-2,6-dien-3-one is prepared by the method of Moore et al. (*J. Org. Chem.* 28 (1963) 2200). The dien-3-one is then converted to exo-4-methoxybicyclo [3.2.1]octa-2,6-diene as described by S. Winstein et al. (*J. Am. Chem. Soc.* 89 (1967) 3656).

The bishomoaromatic anion is generated using Winstein's procedure by shaking the methoxy compound (408 mg, 3.0 mmol) in tetrahydrofuran (30 mL) with Na—K alloy (0.50 g) at 0° C. The resulting anion is separated from excess alloy and methoxide salt by filtration in vacuo.

The carbanion solution is added by cannula to a stirred slurry of zirconium tetrachloride (326 mg, 1.4 mmol) in tetrahydrofuran (20 mL) at −78° C. The reaction mixture is stirred and allowed to warm to room temperature. Volatiles are removed in vacuo. The residue is extracted with toluene to give a solution of the organometallic complex. This solution can be used "as is" for polymerizing olefins. The expected product is bis(bicyclo[3.2.1]octa-2,6-dienyl) zirconium dichloride.

Additional evidence for the suitability of homoaromatic anions as ligands for single-site catalysts comes from molecular modeling studies. Using molecular orbital calculations at the PM3™ (Spartan software distributed by Wavefunction, Inc.), we found that zirconocenium active sites based on homoaromatic anions of the type described herein have calculated reactivity indices (e.g., hardness and electrophilicity) that are remarkably similar to the values calculated for traditional ligands based on cyclopentadienyl anions. The model calculations suggest that the electronic and steric environments of homoaromatic anions make them an excellent choice as ligands for single-site catalysts.

The preceding examples are meant only as illustrations. The following claims define the invention.

I claim:

1. A catalyst which comprises:
   (a) an activator; and
   (b) an organometallic complex comprising a Group 3 to 10 transition or lanthanide metal, M, and at least one homoaromatic anionic ligand that is π-bonded to M.

2. The catalyst of claim 1 wherein the activator is selected from the group consisting of alumoxanes, alkylaluminum compounds, organoboranes, ionic borates, and ionic aluminates.

3. The catalyst of claim 1 comprising a Group 4 transition metal.

4. The catalyst of claim 1 further comprising a substituted or unsubstituted cyclopentadienyl, indenyl, or fluorenyl group.

5. The catalyst of claim 1 further comprising a polymerization-stable, anionic ligand selected from the group consisting of boraaryl, pyrrolyl, indolyl, quinolinyl, pyridinyl, and azaborolinyl.

6. The catalyst of claim 1 wherein the homoaromatic ligand is bridged to another ligand.

7. The catalyst of claim 1 wherein the homoaromatic ligand is a bishomoaromatic, $6\pi$-electron system.

8. The catalyst of claim 7 wherein the bishomoaromatic ligand is a bicyclic [3.2.1] or [3.2.2] hydrocarbon ring system.

9. The catalyst of claim 7 wherein the homoaromatic ligand is a bicyclic [3.2.1] or [3.2.2] heteroatom-containing ring system.

10. A process which comprises polymerizing an olefin in the presence of the catalyst of claim 1.

11. A process which comprises copolymerizing ethylene with a $C_3$–$C_{10}$ α-olefin in the presence of the catalyst of claim 1.

12. A method of producing the catalyst of claim 1 which comprises:

(i) deprotonating a homoaromatic anionic precursor and reacting the resulting anion with a Group 3 to 10 transition or lanthanide metal source to produce an organometallic complex comprising the metal, M, and at least one homoaromatic anionic ligand that is $\pi$-bonded to M, and (ii) combining the product of (i) with an activator.

* * * * *